(12) United States Patent
Shih

(10) Patent No.: US 6,504,626 B1
(45) Date of Patent: Jan. 7, 2003

(54) SCANNER WITH AN EXTERNAL KEYBOARD FOR CONTROLLING OPERATIONS OF THE SCANNER

(75) Inventor: Po-Sheng Shih, Hsin-Chu (TW)

(73) Assignee: eMemory Technology Inc., Hsin-Chu (TW)

( * ) Notice: Subject to any disclaimer, the term of this patent is extended or adjusted under 35 U.S.C. 154(b) by 0 days.

(21) Appl. No.: 09/378,702

(22) Filed: Aug. 23, 1999

(30) Foreign Application Priority Data

Jul. 26, 1999 (TW) ........................................ 88112606 A

(51) Int. Cl.[7] ................................................ H04N 1/32
(52) U.S. Cl. ........................ 358/442; 358/497; 358/474; 358/468; 361/686; 361/679; 361/680; 361/681; 710/73; 710/5
(58) Field of Search ................................. 358/442, 474, 358/468, 494, 400, 421, 497; 361/686, 679, 680, 681; 710/8, 72, 73, 5; 235/435; 382/312, 325, 313

(56) References Cited

U.S. PATENT DOCUMENTS

| | | | | |
|---|---|---|---|---|
| 4,571,053 A | * | 2/1986 | Kasama et al. | |
| 4,893,196 A | * | 1/1990 | Koshiyouji et al. | |
| 5,091,747 A | * | 2/1992 | Tsai | |
| 5,550,938 A | * | 8/1996 | Hayakawa et al. | |
| 5,555,105 A | * | 9/1996 | Shahir et al. | |
| 5,822,080 A | * | 10/1998 | Chavez | |
| 5,854,945 A | * | 12/1998 | Criscito et al. | |
| 5,920,401 A | * | 7/1999 | Street et al. | |
| 5,928,337 A | * | 7/1999 | Wieringa | |
| 6,078,407 A | * | 6/2000 | Ma | |
| 6,101,004 A | * | 8/2000 | Sung | |
| 6,233,065 B1 | * | 5/2001 | Lee | |
| 6,312,175 B1 | * | 11/2001 | Lum | |

FOREIGN PATENT DOCUMENTS

CN          1284688          * 2/2002

* cited by examiner

Primary Examiner—Edward Coles
Assistant Examiner—Tia A. Carter
(74) Attorney, Agent, or Firm—Winston Hsu

(57) ABSTRACT

The invention relates to a scanner with an external keyboard. The scanner comprises a scanner housing, a control circuit installed in the scanner housing for controlling operations of the scanner, a scanning module installed in the scanner housing and connected to the control circuit for scanning a document and generating corresponding document image signals, a keyboard electrically connected to the control circuit for inputting various key signals, and a display panel installed on the surface of the scanner housing and connected to the control circuit for displaying signals transmitted from the control circuit. The control circuit controls the operations of the scanner according to the key signals inputted by a user through the keyboard, and displays the key signals or instruction messages on the display panel.

15 Claims, 4 Drawing Sheets

SCANNER WITH AN EXTERNAL KEYBOARD FOR CONTROLLING OPERATIONS OF THE SCANNER

BACKGROUND OF THE INVENTION

1. Field of the Invention

The invention relates to a scanner, and more particularly, to a scanner with an external keyboard for controlling operations of the scanner.

2. Description of the Prior Art

Please refer to FIG. 1 and FIG. 2. FIG. 1 is a perspective diagram of a prior art scanner 10. FIG. 2 is a functional block diagram of the scanner 10 in FIG. 1. The scanner 10 comprises a scanner housing 12, a control circuit 14 installed in the scanner housing 12 for controlling operations of the scanner 10, a scanning module 16 installed in the scanner housing 12 and connected to the control circuit 14 for scanning a document and generating corresponding document image signals, and a user interface 20 installed on the scanner housing 12 and connected to the control circuit 14. The user interface 20 comprises a plurality of keys 21 for inputting key signals.

The control circuit 14 comprises a memory 24 for storing programs and data, and a processor 26 for executing the programs in the memory 24. The memory 24 comprises an operating system 28 for controlling the operations of the processor 26, a scanning module driving program 30 executed under the operating system 28 for controlling the operations of the scanning module 16 and processing the document image signals generated by the scanning module 16, a user interface driving program 32 executed under the operating system 28 for controlling the operations of the user interface 20, and an application program 36 executed under the operating system 28 for setting the operation mode of the scanning module driving program 30 and the processing method of the image signals according to the key signals inputted by the user and transmitted by using the user interface driving program 32.

The control circuit 14 controls the operations of the scanner 10 according to the key signals inputted by the user and transmitted from the user interface 20. Because the space on the scanner housing 12 is very limited, the scanner housing 12 is unable to accommodate sufficient number of regular sized keys 21. Unless the keys 21 are made very small, the small number of keys 21 may limit the performance of the scanner 10. Moreover, it is very costly to install a large number of small keys 21 on the scanner 10. And it will make the scanner 10 look cumbersome if a great number of large keys 21 are installed on the scanner 10.

SUMMARY OF THE INVENTION

It is therefore a primary objective of the present invention to provide a scanner with an external keyboard to solve the mentioned problem.

Briefly, in a preferred embodiment, the present invention provides a scanner comprising:

a scanner housing;

a control circuit installed in the scanner housing for controlling operations of the scanner;

a scanning module installed in the scanner housing and connected to the control circuit for scanning a document and generating corresponding document image signals;

a keyboard connected to the control circuit for inputting key signals; and a display panel installed on the surface of the scanner housing and connected to the control circuit for displaying signals transmitted from the control circuit;

wherein the control circuit controls the operations of the scanner according to the key signals inputted by a user through the keyboard, and displays the key signals or instruction messages on the display panel.

It is an advantage of the present invention that the scanner has an external keyboard. Therefore various key signals can be easily inputted through regular sized keys on the keyboard to control operations of the scanner.

These and other objects and the advantages of the present invention will no doubt become obvious to those of ordinary skill in the art after having read the following detailed description of the preferred embodiment that is illustrated in the various figures and drawings.

DETAILED DESCRIPTION OF THE PREFERRED EMBODIMENT

Figure 1:
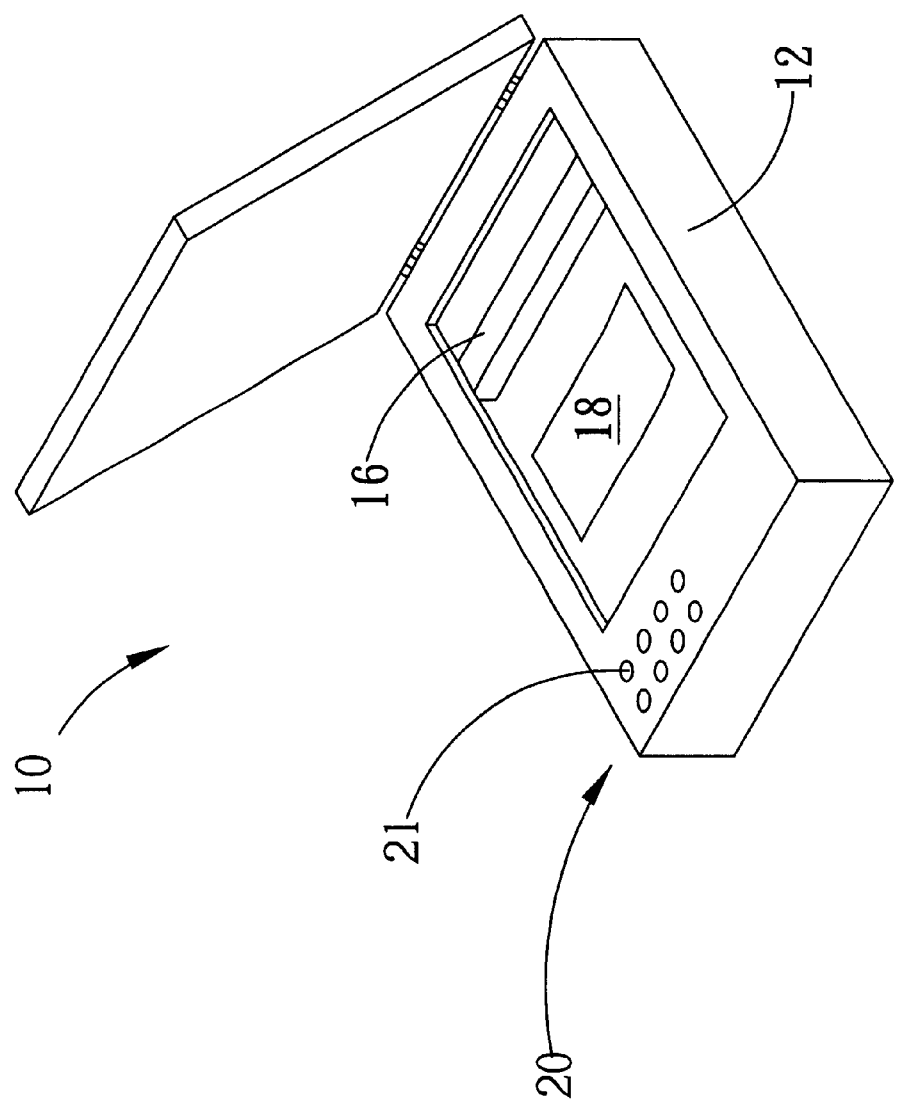
FIG. 1 is a perspective diagram of a prior art scanner.
Figure 2:
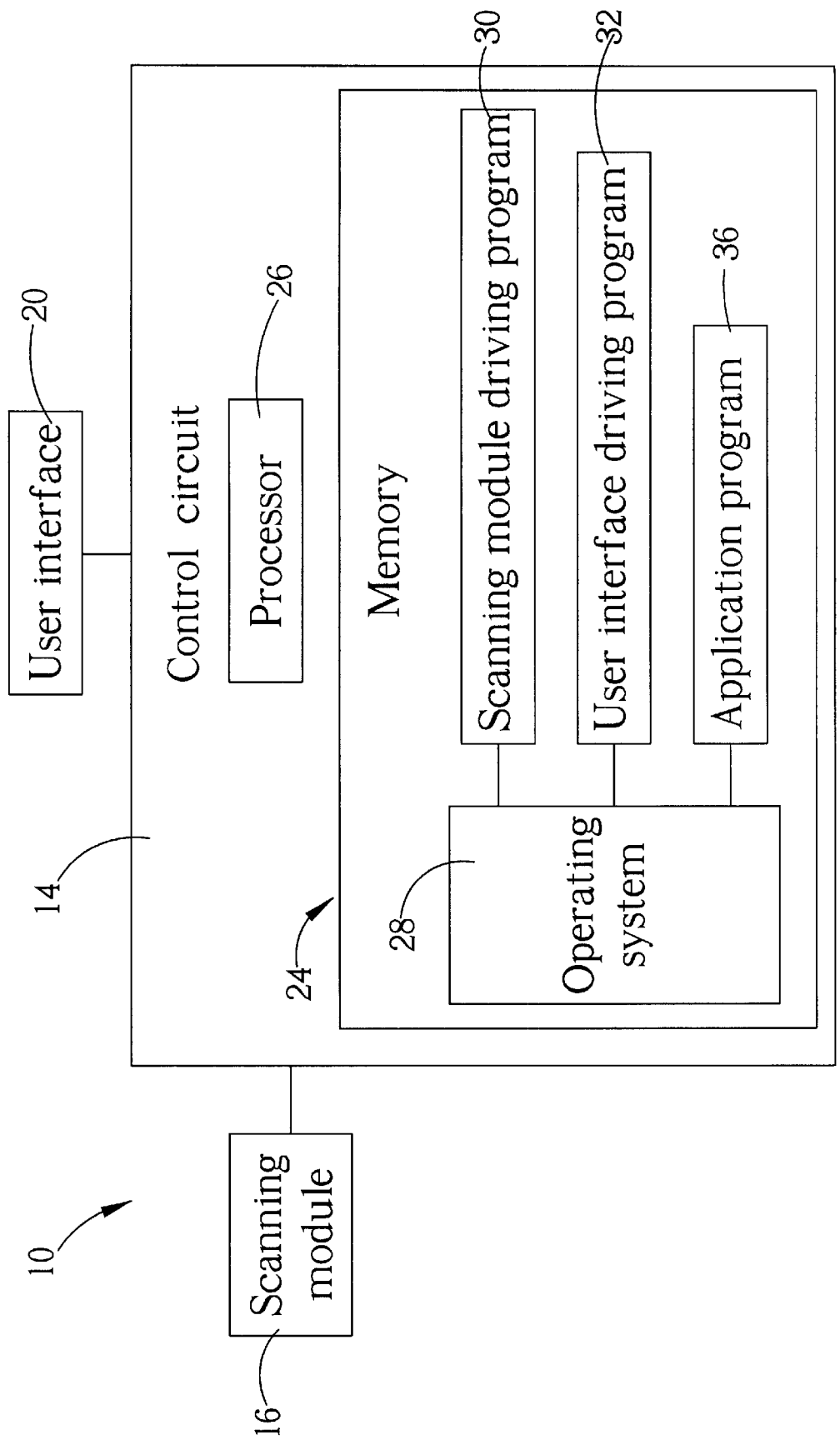
FIG. 2 is a functional block diagram of the scanner in FIG. 1.
Figure 3:
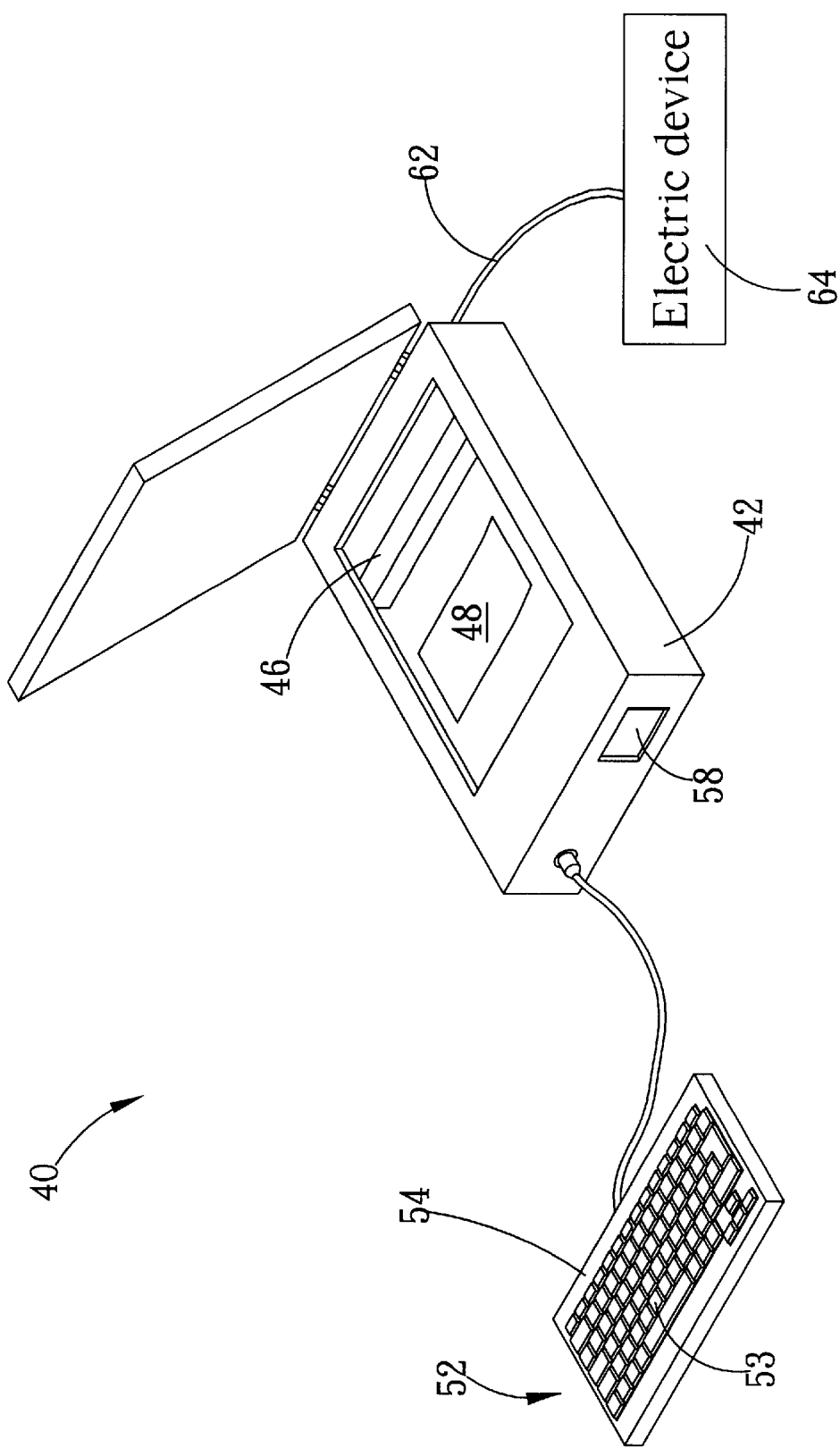
FIG. 3 is a perspective diagram of a scanner according to the present invention.
Figure 4:
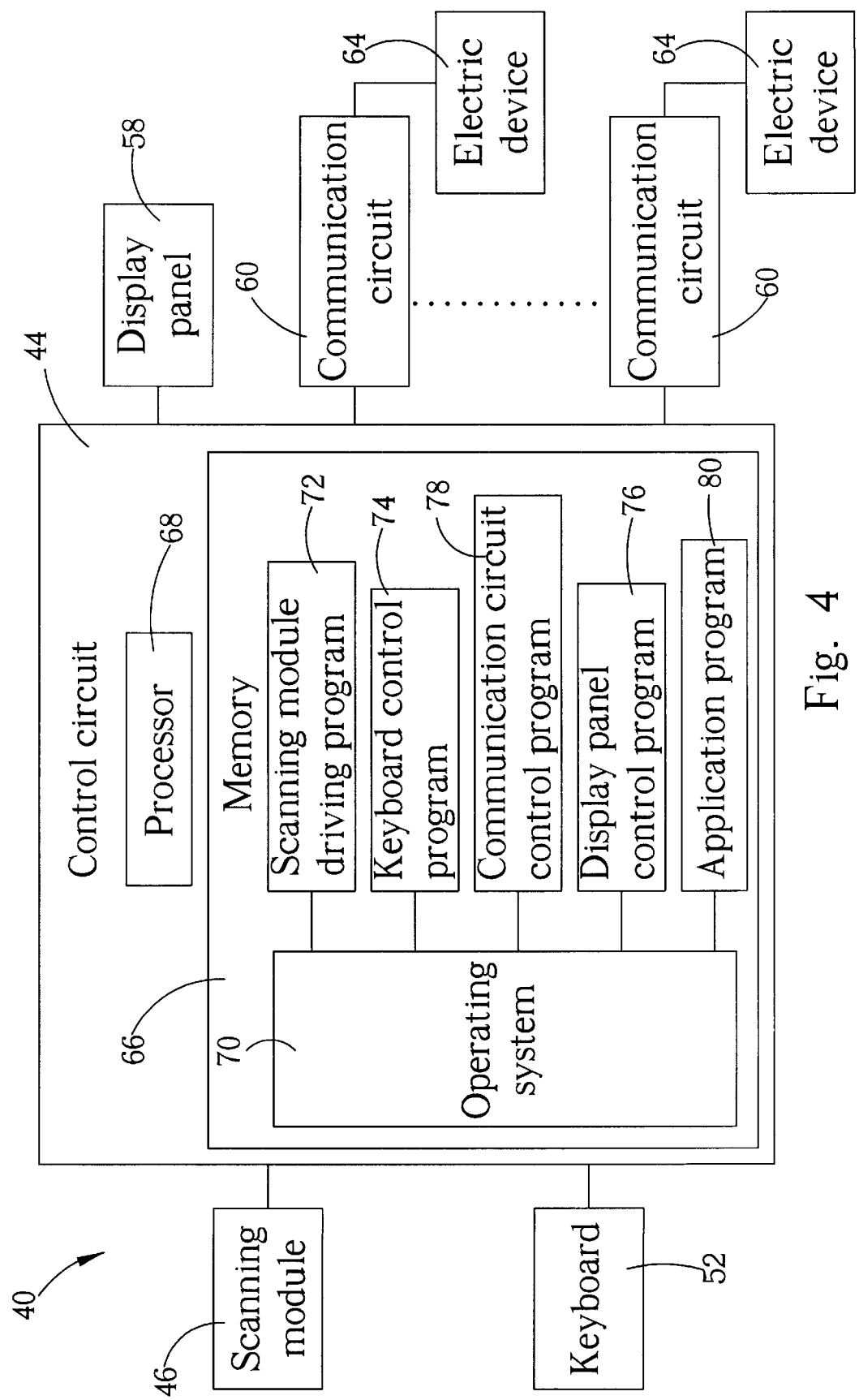
FIG. 4 is a functional block diagram of the scanner in FIG. 3.

Please refer to FIG. 3 and FIG. 4. FIG. 3 is a perspective diagram of a scanner 40 according to the present invention. FIG. 4 is a functional block diagram of the scanner 40 in FIG. 3. The scanner 40 comprises a scanner housing 42, a control circuit 44 installed in the scanner housing 42 for controlling operations of the scanner 40, a scanning module 46 installed in the scanner housing 42 and connected to the control circuit 44 for scanning a document 48 and generating corresponding document image signals, a keyboard 52 electrically connected to the control circuit 44 for inputting the key signals, a display panel 58 installed on the surface of the scanner housing 42 and connected to the control circuit 44 for displaying the signals transmitted from the control circuit 44, and at least one communication circuit 60 for transmitting electric signals to an electric device 64. The control circuit 44 can be connected to a plurality of communication circuits 60 at the same time so that data can be transmitted to the electric devices 64 connected to each of the communication circuits 60 concurrently. The keyboard 52 comprises a keyboard housing 54, a plurality of number keys, character keys, symbol keys, control keys and function keys 53 positioned on the keyboard housing 54 for generating key signals. Moreover, the keyboard 52 can be connected with the control circuit 44 in a wireless manner.

The control circuit 44 comprises a memory 66 for storing programs and data, and a processor 68 for executing the programs in the memory 66. The memory 66 comprises an operating system 70 for controlling the operations of the processor 68, a scanning module driving program 72 executed under the operating system 70 for controlling the operations of the scanning module 46 and processing the document image signals generated by the scanning module 46, a keyboard control program 74 executed under the operating system 70 for controlling the operations of the keyboard 52, a display panel control program 76 executed under the operating system 70 for controlling the operations of the display panel 58, a communication circuit control program 78 executed under the operating system 70 for controlling the operations of the communication circuit 60, and an application program 80 executed under the operating system 70.

The application program 80 is used for setting the operation mode of the scanning module driving program 72 and the processing method of the image signals according to the key signals inputted by the user and transmitted from the keyboard control program 74, displaying the key signals or the instruction messages on the display panel 58 by using the display panel control program 76, and transmitting the image signals to the electric device 64 by using the communication circuit control program 78.

The electric device 64 can be an internet server or a local area network (LAN) server, and the application program 80 can be an e-mail processing program for transmitting the document image signals in an e-mail format to the internet or LAN server by using the communication circuit control program 78. The electric device 64 can be a printer, and the application program 80 can be a document image processing program that transmits the document image signals to the printer for printing by using the communication circuit control program 78. The electric device 64 can be a personal computer, and the application program 80 can be a document processing program that transmits the document image signals to the personal computer by using the communication circuit control program 78. The electric device 64 can also be a fax machine, and the application program 80 can be a facsimile processing program that transmits the document image signals to the fax machine by using the communication circuit control program 78.

The communication circuit 60 can be a modem or a signal modulation circuit. The communication circuit 60 also can be a network card, a network interface circuit, a printer interface circuit, or a computer interface circuit (such as SCSI, EPP, IEEE1284.3 or RS232 and so on) for transmitting the document image signals to the electric device 64.

Compared with the prior art scanner 10, the scanner 40 has an external keyboard 52. Therefore, a large number of functions of the scanner 40 can be easily inputted through the keys 53 on the keyboard 52. For example, a user can use the keyboard 52 to input an e-mail address, which can be displayed on the display panel 58 as well. By using an e-mail processing program, the scanned image is processed as a file and transmitted to the internet or LAN server through the communication circuit 60 without using a computer. The user also can use the keyboard 52 to input a fax number and transmit the scanned image to a fax machine. Furthermore, the user can use the keyboard 52 to input various parameters of a printer, such as number of pages, size of pages, etc. Moreover, the user has an option to operate the scanner 40 with or without using a computer.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:
   a scanner housing;
   a control circuit installed in the scanner housing for controlling operations of the scanner;
   a scanning module installed in the scanner housing and connected to the control circuit for scanning a document and generating corresponding document image signals;
   a keyboard electrically connected to the control circuit for inputting key signals; and
   a display panel installed on the surface of the scanner housing and connected to the control circuit for displaying signals transmitted from the control circuit;
   wherein the control circuit controls the operations of the scanner according to the key signals inputted by a user through the keyboard, and displays the key signals or instruction messages on the display panel.

2. The scanner of claim 1 wherein the control circuit comprises a memory for storing programs and data, and a processor for executing the programs in the memory, the memory comprises:
   an operating system for controlling the operations of the processor;
   a scanning module driving program executed under the operating system for controlling the operations of the scanning module and processing the document image signals generated by the scanning module;
   a keyboard control program executed under the operating system for controlling the operations of the keyboard;
   a display panel control program executed under the operating system for controlling the operations of the display panel; and
   an application program executed under the operating system for setting the operation mode of the scanning module driving program and the processing method of the image signals according to the key signals inputted by the user and transmitted from the keyboard control program, and displaying the key signals or the instruction messages on the display panel by using the display panel control program.

3. The scanner of claim 2 further comprising a communication circuit for transmitting electric signals to an electric device, and a communication circuit control program stored in the memory for controlling the operations of the communication circuit, wherein the application program transmits the document image signals to the electric device by using the communication circuit control program.

4. The scanner of claim 3 wherein the electric device is an internet server.

5. The scanner of claim 4 wherein the application program is an e-mail processing program for transmitting the document image signals in an e-mail format to the internet server by using the communication circuit control program.

6. The scanner of claim 3 wherein the electric device is a local area network (LAN) server.

7. The scanner of claim 6 wherein the application program is an e-mail processing program for transmitting the document image signals in an e-mail format to the LAN server by using the communication circuit control program.

8. The scanner of claim 3 wherein the electric device is a printer, and the application program is a document image processing program that transmits the document image signals to the printer for printing by using the communication circuit control program.

9. The scanner of claim 3 wherein the electric device is a personal computer, and the application program is a document processing program that transmits the document image signals to the personal computer by using the communication circuit control program.

10. The scanner of claim 3 wherein the electric device is a fax machine.

11. The scanner of claim 10 wherein the application program is a facsimile processing program that transmits the document image signals to the fax machine by using the communication circuit control program.

12. The scanner of claim 3 wherein the communication circuit is a modem or a signal modulation circuit.

13. The scanner of claim 3 wherein the communication circuit is a network card or a network interface circuit.

14. The scanner of claim 3 wherein the communication circuit is a printer interface circuit.

15. The scanner of claim 3 wherein the communication circuit is a computer interface circuit.

* * * * *

UNITED STATES PATENT AND TRADEMARK OFFICE
CERTIFICATE OF CORRECTION

PATENT NO. : 6,504,626 B1
DATED : January 7, 2003
INVENTOR(S) : Shih

It is certified that error appears in the above-identified patent and that said Letters Patent is hereby corrected as shown below:

Title page,
Item [73], Assignee, should read as follows: -- AVISION INC., Hsin – Chu (TW) --

Signed and Sealed this

Fifth Day of April, 2005

JON W. DUDAS
*Director of the United States Patent and Trademark Office*